United States Patent
Sundberg et al.

(10) Patent No.: US 11,683,836 B2
(45) Date of Patent: Jun. 20, 2023

(54) METHODS AND ARRANGEMENTS FOR SUPPORTING A RANDOM ACCESS PROCEDURE

(71) Applicant: Telefonaktiebolaget LM Ericsson (publ), Stockholm (SE)

(72) Inventors: Mårten Sundberg, Årsta (SE); Stefan Eriksson Löwenmark, Färentuna (SE); Nicklas Johansson, Brokind (SE); Gustav Almquist, Järfälla (SE); John Walter Diachina, Garner, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 610 days.

(21) Appl. No.: 16/321,770

(22) PCT Filed: Sep. 12, 2017

(86) PCT No.: PCT/SE2017/050895
§ 371 (c)(1),
(2) Date: Jan. 29, 2019

(87) PCT Pub. No.: WO2018/052362
PCT Pub. Date: Mar. 22, 2018

(65) Prior Publication Data
US 2020/0053787 A1     Feb. 13, 2020

Related U.S. Application Data

(60) Provisional application No. 62/393,710, filed on Sep. 13, 2016.

(51) Int. Cl.
*H04W 74/08*     (2009.01)
*H04W 64/00*     (2009.01)
(Continued)

(52) U.S. Cl.
CPC ....... *H04W 74/0833* (2013.01); *H04W 72/23* (2023.01); *H04W 74/004* (2013.01); *H04W 74/006* (2013.01); *H04W 74/0866* (2013.01)

(58) Field of Classification Search
CPC ........... H04W 74/0833; H04W 72/042; H04W 72/23; H04W 74/08; H04W 74/004;
(Continued)

(56) References Cited

U.S. PATENT DOCUMENTS 6,144,676 A * 11/2000 Hamalainen .......... H04L 1/0059
370/528
6,532,225 B1 * 3/2003 Chang .................. H04W 76/10
370/341
(Continued)

FOREIGN PATENT DOCUMENTS

WO          02095985 A1    11/2002
WO       2016050072 A1     4/2016
WO     WO-2016050072 A1 *  4/2016  ............ H04W 74/08

OTHER PUBLICATIONS

Author Unknown, "Technical Specification Group GSM/EDGE Radio Access Network; General Packet Radio Service (GPRS); Overall description of the GPRS radio interface; Stage 2 (Release 13)," Technical Specification 43.064, Version 13.2.0, 3GPP Organizational Partners, May 2016, 117 pages.
(Continued)

*Primary Examiner* — Edan Orgad
*Assistant Examiner* — Vanneilian Lalchinthang
(74) *Attorney, Agent, or Firm* — Christopher & Weisberg, P.A.

(57) ABSTRACT

A method by a communication device for supporting a random access procedure in a wireless communication network. The communication device provides an indicator for indicating a presence of an initial access request by the communication device. The initial access request is part of
(Continued)

the random access procedure. The indicator comprises a pre-defined synchronization sequence, wherein one of: the indicator comprises a first access burst extending over one time slot, wherein the first access burst comprises the pre-defined synchronization sequence, which is longer than 41 bits, and the indicator comprises a second access burst extending over two time slots, the second access burst comprising the pre-defined synchronization sequence, which is longer than 88 bits. The communication device transmits the indicator on a random access channel in uplink to a network node. The indicator indicates the presence to the network node of the initial access request.

16 Claims, 6 Drawing Sheets

(51) Int. Cl.
*H04W 74/00* (2009.01)
*H04W 72/23* (2023.01)

(58) Field of Classification Search
CPC .............. H04W 74/006; H04W 64/00; H04W 64/003; H04W 24/10; H04W 74/0866; H04W 56/0035; H04W 56/001; H04W 56/005; H04W 68/005; H04L 1/00
USPC ......................................................... 370/329
See application file for complete search history.

(56) References Cited

U.S. PATENT DOCUMENTS

| | | | |
|---|---|---|---|
| 9,237,557 B2* | 1/2016 | Lee ........................ | H04W 72/04 |
| 2003/0076812 A1* | 4/2003 | Benedittis ............ | H04B 7/2668 370/350 |
| 2003/0156594 A1* | 8/2003 | Trott ........................ | H04L 27/18 370/442 |
| 2003/0169722 A1* | 9/2003 | Petrus .................. | H04B 7/2656 370/347 |
| 2005/0243744 A1* | 11/2005 | Tan ........................ | H04W 72/10 370/278 |
| 2011/0222527 A1* | 9/2011 | Hole .................. | H04W 74/0833 370/348 |
| 2015/0016312 A1* | 1/2015 | Li .............................. | H04L 5/14 370/280 |
| 2015/0078310 A1* | 3/2015 | Kreuzer .............. | H04W 52/245 370/329 |
| 2019/0200320 A1* | 6/2019 | Selvaganapathy ........................... H04W 74/0833 |

OTHER PUBLICATIONS

Ericsson LM, "R6-160159: Radio interface enhancements for EC-GSM-IoT—New access burst formats," Third Generation Partnership Project (3GPP), TSG RAN6#2, Nov. 14-18, 2016, 4 pages, Reno, USA.

Nokia et al., "R6-160092: New WID on Radio Interface Enhancements for EC-GSM-IoT," Third Generation Partnership Project (3GPP), TSG-RAN WG6 #1, Sep. 22-26, 2016, 7 pages, Gothenburg, Sweden.

International Search Report and Written Opinion for International Patent Application No. PCT/SE2017/050895, dated Dec. 18, 2017, 11 pages.

* cited by examiner

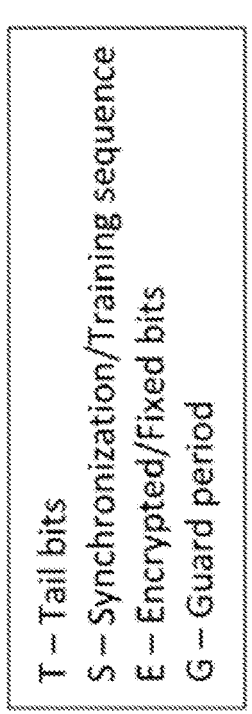
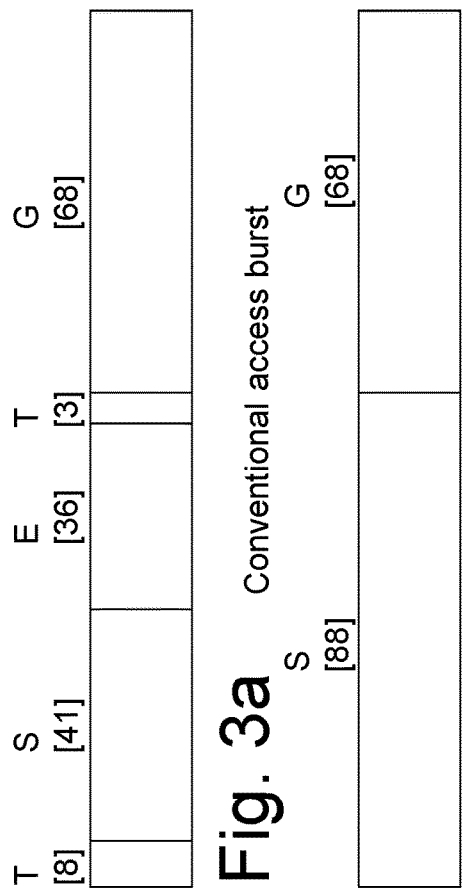
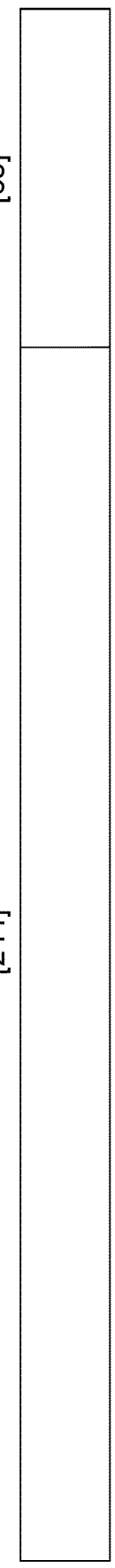
T — Tail bits
S — Synchronization/Training sequence
E — Encrypted/Fixed bits
G — Guard period
Fig. 3a  Conventional access burst
T [8]  S [41]  E [36]  T [3]  G [68]
Fig. 3b  1 TS Extended coverage access burst
S [88]  G [68]
Fig. 3c  2 TS Extended coverage access burst
S [244]  G [68]

METHODS AND ARRANGEMENTS FOR SUPPORTING A RANDOM ACCESS PROCEDURE

This application is a 35 U.S.C. § 371 national phase filing of International Application No. PCT/SE2017/050895, filed Sep. 12, 2017, which claims the benefit of U.S. Provisional Application No. 62/393,710, filed Sep. 13, 2016, the disclosures of which are incorporated herein by reference in their entireties.

TECHNICAL FIELD

Embodiments herein relate to methods and arrangements in a wireless communication network, e.g. telecommunication network, for supporting a random access procedure in the wireless communication network that is preferably a GSM based network, such as Extended Coverage GSM (EC-GSM). In particular, the present disclosure relates to a communication device and methods performed thereby for supporting a random access procedure in a wireless communication network. The present disclosure relates as well to a network node and methods performed thereby for supporting a random access procedure in a wireless communication network.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by 3GPP.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless devices within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM). Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type Communication (MTC) has in recent years, especially in the context of the Internet of Things (IoT), shown to be a growing market segment for cellular technologies. An MTC device may be a communication device, typically a wireless communication device or simply wireless device, that is a self and/or automatically controlled unattended machine and that is typically not associated with an active human user in order to generate data traffic. A MTC device is typically more simple, and typically associated with a more specific application or purpose, than and in contrast to a conventional mobile phone or smart phone. MTC involves communication in a wireless communication network to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

A general problem related to (re)using existing technologies and systems is that the requirements for the new type of devices are typically different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modifications need of existing systems and technology should of course be cost efficient, such as enabled by low complexity modifications, and preferably allowing legacy devices, i.e. devices already being employed, to continue to be used and co-exist with the new type of devices in one and the same wireless communication system.

In 3GPP Rel-13 a feature called Extended Coverage GSM for Internet of Things (EC-GSM-IoT) was introduced, see 3GPP TS 43.064 v13.2.0. EC-GSM-IoT, or simply EC-GSM, may also be referred to as Extended Coverage EGPRS (EC-EGPRS). The main purpose with the feature was to extend coverage compared to conventional GPRS/EDGE with 20 dB. As part of the feature, a new mobile output power class was also specified at 10 dB lower nominal output power than previously existing in the specifications. However, the feature has not been adopted to take this 10 dB loss in uplink coverage into account, and hence using the EC-GSM-IoT feature in conjunction with the new mobile output power class only extends uplink coverage by 10 dB, and by that also the overall coverage extension is limited to 10 dB. An initiative, see e.g. R6-160092, "New WID on Radio Interface Enhancements for EC-GSM-IoT", Nokia Networks, RAN6 #1, has been started to bridge the remaining 10 dB gap in uplink coverage by introducing enhancements to further extend coverage in the uplink for this specific mobile output power class by 4-6 dB. The exact extension still to be decided.

In pursuing such an improvement of the coverage, many, even all, uplink channels may need to be revisited to ensure the coverage aimed for can be accommodated.

One of these channels is the random access channel where already in Rel-13 it is challenging to reach the targeted performance.

Coverage enhancements in Rel-13 were achieved using the principle of blind repetitions, i.e. a block is repeated N number of times at the transmitter side, which allows the receiver to accumulate the repetitions which provides processing gain, such as increase in the received Signal to Noise Ratio (SNR).

However, with the existing methods the coverage aimed for continues to be under the targeted performance.

SUMMARY

It is an object to alleviate or at least reduce one or more problems indicated herein.

Hence, the object may be to provide one or more improvements with regard to extending coverage on a random access channel, e.g. the Extended Coverage Random Access Channel (EC-RACH) of Extended Coverage GSM (EC-GSM).

According to a first aspect of embodiments herein, the object is achieved by a method performed by a communication device. The method is for supporting a random access procedure in a wireless communication network. The communication device provides an indicator for indicating a presence of an initial access request by the communication device. The initial access request is part of the random access procedure. The indicator comprises a pre-defined synchronization sequence, wherein one of the following applies. In a first option, the indicator comprises a first access burst extending over one time slot, wherein said first access burst comprises the pre-defined synchronization sequence, and the pre-defined synchronization sequence is longer than 41 bits. In another option, the indicator comprises a second access burst extending over two time slots, said second access burst comprising the pre-defined synchronization sequence, and the pre-defined synchronization sequence is longer than 88 bits. The communication device transmits the indicator on a random access channel in uplink to a network node of the wireless communication network. The indicator indicates the presence to the network node of the initial access request by the communication device.

According to a second aspect of embodiments herein, the object is achieved by a method performed by a network node. The method is for supporting the random access procedure in the wireless communication network. The network node receives from the communication device, the indicator on the random access channel on the uplink. The indicator indicates the presence of the initial access request by the communication device. The initial access request is part of the random access procedure. The indicator comprises a pre-defined synchronization sequence, wherein one of the following applies. In the first option, the indicator comprises the first access burst extending over one time slot, wherein the first access burst comprises the pre-defined synchronization sequence, and the pre-defined synchronization sequence is longer than 41 bits. In another option, the indicator comprises the second access burst extending over two time slots, the second access burst comprising the pre-defined synchronization sequence, and the pre-defined synchronization sequence is longer than 88 bits. The network node initiates, in response to the received indicator, completion of the random access procedure with the communication device.

According to a third aspect of embodiments herein, the object is achieved by a device configured to support the random access procedure in the wireless communication network. The device is further configured to provide the indicator for indicating the presence of the initial access request by the device. The initial access request is part of the random access procedure. The indicator comprises the pre-defined synchronization sequence, and one of the following options applies. In the first option, the indicator comprises the first access burst extending over one time slot, wherein the first access burst comprises the pre-defined synchronization sequence, and the pre-defined synchronization sequence is longer than 41 bits. In another option, the indicator comprises the second access burst extending over two time slots, the second access burst comprising the pre-defined synchronization sequence, and the pre-defined synchronization sequence is longer than 88 bits. The device is further configured to transmit the indicator on the random access channel in uplink to a network node of the wireless communication network. The indicator indicates the presence to the network node of the initial access request by the device.

According to a fourth aspect of embodiments herein, the object is achieved by the network node, configured to support the random access procedure in the wireless communication network. The network node is further configured to receive from the device, the indicator on the random access channel on the uplink. The indicator is further configured to indicate the presence of the initial access request by the device. The initial access request is part of the random access procedure. The indicator comprises the pre-defined synchronization sequence, wherein one of the following options applies. In a first option, the indicator comprises the first access burst extending over one time slot, wherein the first access burst comprises the pre-defined synchronization sequence, and the pre-defined synchronization sequence is longer than 41 bits. In another option, the indicator comprises the second access burst extending over two time slots, the second access burst comprising the pre-defined synchronization sequence, and the pre-defined synchronization sequence is longer than 88 bits. The network node is further configured to initiate, in response to the received indicator, completion of the random access procedure with the device.

By transmitting the indicator comprising the longer pre-defined synchronization sequence to the network node, the communication device enables the network node to detect the presence of the initial access request by the communication device with higher accuracy than with a shorter synchronization sequence. Therefore, the coverage of the random access channel is improved in that the quantity of access burst repetitions used for transmitting the initial access request is less than what would be used for transmitting the initial access request for that same level of extended coverage without the longer pre-defined synchronization sequence. By receiving the indicator from the communication device, the network node is enabled to initiate completion of the random access procedure with the communication device with improved coverage of the random access channel, whereby the quantity of access burst repetitions used for receiving the initial access request is less than what would be used for receiving an initial access request for that same level of extended coverage without the longer pre-defined synchronization sequence. Therefore, coverage enhancement is improved, without using unnecessary radio and/or processing resources to transmit an initial access request, and without unnecessarily increasing the latency of the system, as the network node may not need to wait for the reception of a higher number of access burst repetitions when receiving an initial access request.

BRIEF DESCRIPTION OF THE DRAWINGS

The various aspects of embodiments disclosed herein, including particular features and advantages thereof, will be readily understood from the following detailed description and the accompanying drawings, in which FIGS. 1-8 are shown, according to the following description.

FIG. 1 is a schematic representation illustrating the real and ideal processing gain as a function of the number of transmissions, also referred to as number of repetitions.

FIG. 2 is a schematic representation illustrating an example of a wireless communication network, according to embodiments herein.

FIG. 3 is a schematic representation illustrating a conventional access burst in a), with a first example in b), and a second example in c), of an extended coverage access burst, according to embodiments herein.

FIG. 4 is a flowchart depicting embodiments of a method in a communication device, according to embodiments herein.

FIG. 5 is a schematic block diagram illustrating an embodiment of a communication device, according to embodiments herein.

FIG. 6 is a flowchart depicting a method in a network node, according to embodiments herein.

FIG. 7 is a schematic block diagram illustrating an embodiment of a network node, according to embodiments herein.

DETAILED DESCRIPTION

As part of a development towards embodiments herein, the problems indicated in the Background will first further be discussed.

On the random access channel in EC-GSM, which uses the logical channel Extended Coverage—Random Access Channel (EC-RACH), blind repetitions are spread over 1 or 2 time slots, and multiple Time Division Multiple Access (TDMA) frames. Since a transmitter is not required to provide coherency in its transmissions between TDMA frames, a receiver typically needs to estimate the phase difference between received bursts in TDMA frame M and M+1 in order to compensate for any phase difference before accumulating the bursts. Moreover, with the receiver operating in very low SNR regions, there is a challenge to detect the phase difference, which results in a sub-optimum accumulation of the bursts, and hence in a non-ideal processing gain. One of the problems for the receiver may be to even find the burst in a receiving window of around 70 bits. Due to propagation delay there is a large guard period to accommodate for the delayed transmissions of devices up to 35 km away from the base station. Within the TDMA frame, coherency is guaranteed by the transmitter, which means that the receiver can blindly accumulate the bursts transmitted in the same TDMA frame, which effectively will provide the processing gain.

However, the more the coverage is extended, the lower the SNR that wireless devices are required to operate in, but still the number of timeslots that the EC-RACH is mapped to will be 1 or 2 time slots. Expanding the mapping to more timeslots typically has a non-acceptable impact to the overall system because the quantity of timeslots available for packet data traffic on a frequency supporting a control channel would then become too limited.

Figure 1:
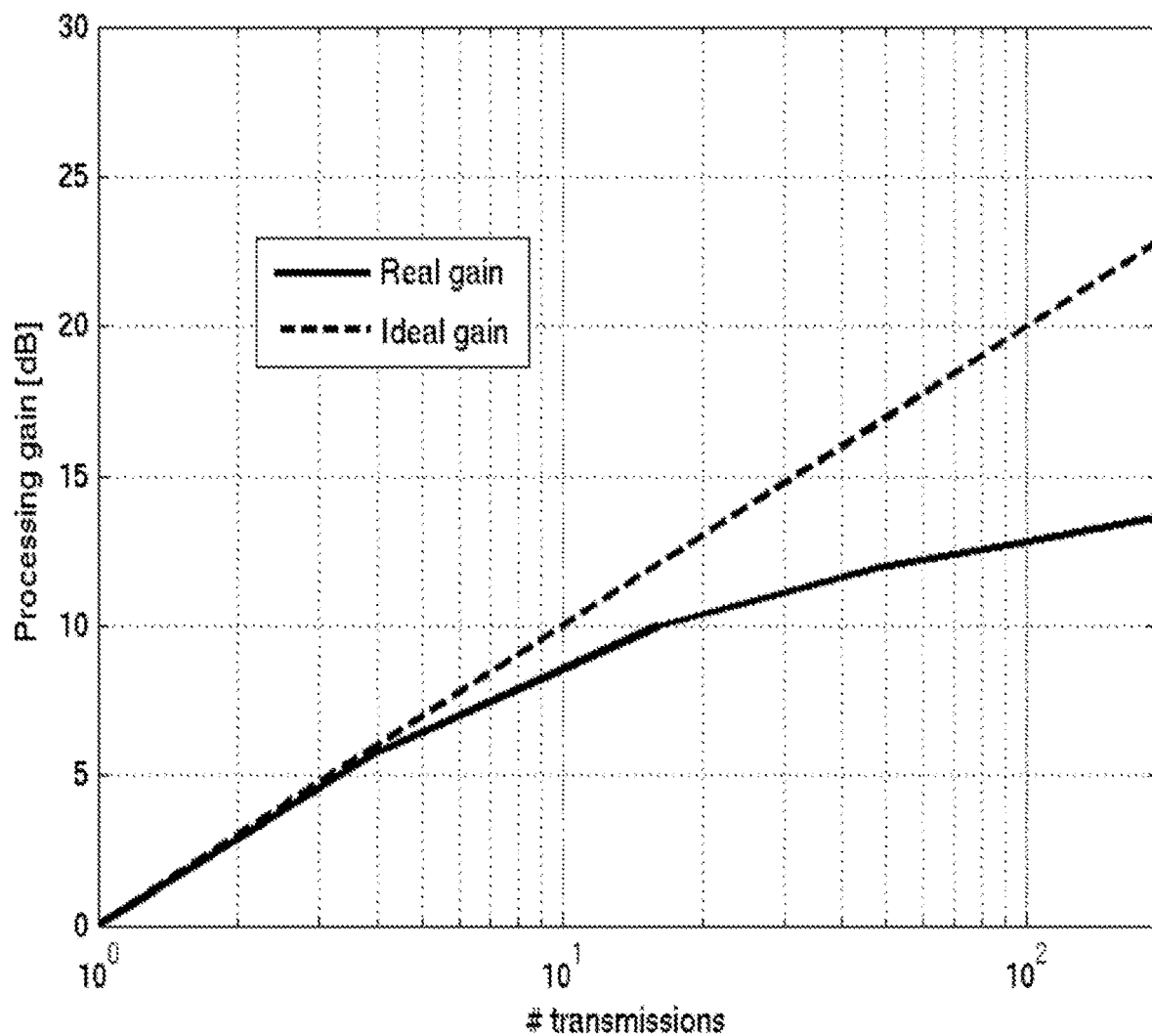

Just increasing the number of blind repetitions will lead to a sub-optimum usage of the resources due to the abovementioned non-ideal processing gain where many more blocks will be transmitted than are actuality required. This is illustrated in FIG. 1 where it can be seen that an actual experienced processing gain deviates more and more from the ideal gain with an increasing number of transmissions.

In order to further extend the coverage of the EC-RACH and in particular to alleviate the problems associated with the non-ideal processing gains with increasing number of repetitions, it is proposed herein to introduce new burst types with e.g. pre-defined synchronization sequences, as will be explained below.

Throughout the following description similar reference numerals may be used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 2:
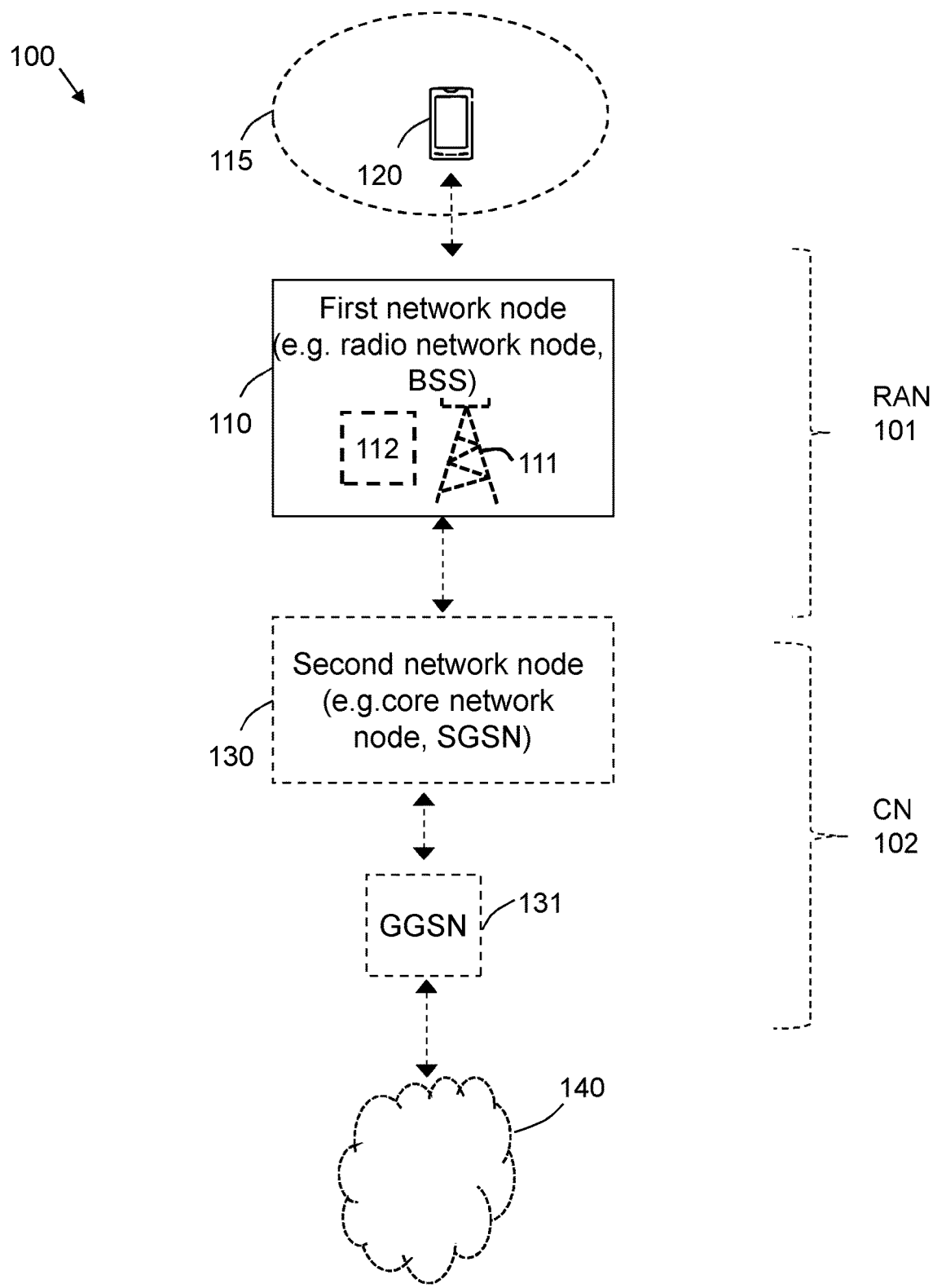

FIG. 2 is a schematic block diagram schematically depicting an example of a wireless communication network 100 in which embodiments herein may be implemented. The wireless communication network 100 is typically a telecommunication network or system, such as a cellular communication network that may be a GSM or a GSM based communication network, and should be supporting EC-GSM. It may comprise a RAN 101 part and a core network (CN) 102 part.

A first network node 110, typically a radio network node, is shown comprised in the wireless communication network 100 and may thus be located in the RAN 101. The first network node 110 may be or be comprised in a Base Station Subsystem (BSS), e.g. such supporting GSM and/or GSM/EDGE, for example when the wireless communication network 100 is a GSM network or a GSM based communication network. The first network node 110 may be or comprise a base station 111, e.g. a Base Transceiver Station (BTS) of said BSS. The first network node 110 may further comprise a controlling node 112 of a base station, which may control one or more base stations, including e.g. the base station 111, and may be a Base Station Controller (BSC) of said BSS.

The wireless communication network 100, e.g. the first network node 110 thereof, may serve and/or control and/or manage one or more devices, e.g. MSs, such as a communication device 120, typically for wireless communication in the wireless communication network 100. Such device may be named e.g. a wireless communication device or simply a wireless device. The communication device 120 is thus supported by and/or operative in the wireless communication network 100. The communication device thus supports one or more Radio Access Technologies (RAT) of the wireless communication network 100, such as supporting EC-GSM. The communication device 120 may be of a certain device type supported by a RAT of the wireless communication network, e.g. a certain device type of EC-GSM operating with particularly low power. This certain device type may be supported in addition to other device types of the RAT. Embodiments herein may be specifically associated with this certain device type, e.g. by being used only when the communication device is of, and/or operate according to this, certain device type.

The communication device 120 may be located in a cell 115 that may be provided by the first network node 110 or by another radio network node (not shown) of the wireless communication network 100.

Further, a second network node 130, typically a core network node, may be comprised in the wireless communication network 100 and may thus be located in the CN 101. The second network node 130 may e.g. be a Serving GPRS Support Node (SGSN) when the wireless communication network 100 is a GSM network or a GSM based communication network.

The communication device 120 may communicate with and/or via the second network node 130 over the first network node 110.

The CN 102 may further provide access for the wireless device to an external network 140, e.g. the Internet. The communication device 120 may thus communicate via the RAN 101 and the CN 102 with the external network 140. When the wireless communication network 100 is a GSM network, or a GSM based communication network, the access to the external network is typically via a Gateway GPRS Support Node (GGSN), such as the GGSN 131 illustrated in the figure.

Attention is drawn to that FIG. 2 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

In the following description, any reference to "the network node 110" may be understood to refer to the first network node 110.

Embodiments of methods performed by the communication device 120 and the network node 100 will now be described in relation to a number of actions. Device embodiments are exemplified in relation to FIGS. 2, 4 and 5. Network node embodiments are exemplified in relation to FIGS. 2, 6 and 7. Note that shown actions may be taken in any suitable order and/or be carried out fully or partly overlapping in time when this is possible and suitable. Dotted lines attempt to illustrate features that are not present in all embodiments.

Any of the actions below may fully or partly involve and/or be initiated and/or be triggered by another, e.g. external, entity or entities, such as device and/or system, than what may actually be carrying out the actions. Such initiation may e.g. be triggered by said another entity in response to a request from the wireless communication network and/or in response to some event resulting from commutations and/or program code executing in said another entity or entities. Said another entity or entities may correspond to or be comprised in a so called computer cloud, or simply cloud, and/or communication with said another entity or entities may be accomplished by means of one or more cloud services.

Before describing the actions of the methods performed by the communication device 120 and the network node 110 according to embodiments herein, it may be useful to describe new burst types that may be applicable to these methods, according to embodiments herein. As stated earlier, embodiments herein may be understood to address the problems of the existing methods by extending the coverage of the EC-RACH based on the introduction of new burst types with e.g., pre-defined synchronization sequences.

In a first group of embodiments there may be an initial access procedure on the random access channel, which may comprise what may be referred to as a wireless device, such as the communication device 120, sending a presence indicator that is for a network node such as the network node 110, e.g. BTS, to only detect if an initial access request has been initiated or not in a monitored set of timeslots and TDMA frames. This may be achieved by having 88 bits of an initial access burst, with tail bits excluded but guard bits included, to consist of a pre-defined synchronization sequence, i.e. a longer synchronization sequence than conventionally used. Or in other words, instead of having an access burst consist of 41 pre-determined bits used for synchronization, 36 encrypted bits, e.g. containing information used to help identify the accessing device and the reason for it sending the access request, and 8 tail bits. Using a longer synchronization sequence like this may allow a receiver, i.e. a network node such as the network node 110, to perform a more accurate detection of the signal, e.g. by correlation, and hence more reliably detect when a burst has been received. It may also allow the receiver to perform a more accurate estimate of the phase difference between bursts sent in different TDMA frames, since it may correlate the received samples of each burst to a known reference rather than to the received samples of another burst.

This may be understood as follows. Since the network node 110 may know the predefined synchronization sequence, and use it as a reference, it may be able correlate the received signal in each TDMA frame to the known synchronization sequence. For each correlation the network node 110 may then know the phase of the received signal in that TDMA frame, and it may therefore derive the phase difference between repetitions in successive TDMA frames. The advantage with this is that the known synchronization sequence, to which the received signal may be correlated, may be understood to be noise free, which reduces the error in the phase difference estimation. In contrast, when the legacy access burst is used, only a small part of the burst is a known sequence. In that case, the receiving network node may typically correlate the received signal in one TDMA frame with the received signal in the next TDMA frame to derive the phase difference between repetitions in successive TDMA frames. This way, the whole burst may be used for correlation, even though the signal may be—partly—unknown to the receiving network node. The disadvantage here is that both signals that are correlated include noise, which increases the error in the phase difference estimation.

Such longer synchronization sequence may therefore be used by a wireless device attempting system access using a single timeslot (TS) on the EC-RACH, that is, with a single instance of the longer synchronization sequence occurring within a single burst that spans a single timeslot, or using a 2 TS on the EC-RACH, namely, with a single instance of the longer synchronization sequence occurring within a single burst that spans 2 timeslots.

The pre-defined longer synchronization sequence may need to be selected to be as orthogonal as possible to the existing 41 bit synchronization sequences defined on the EC-RACH/RACH channels to minimize interference and improve detection performance.

In a second group of embodiments there may be a new burst format that may be understood to be adapted specifically to the 2 TS EC-RACH. This may allow the pre-defined synchronization sequence to span over the 2 TS and therefore be even longer than that in the case of the first group of embodiments discussed above. The same guard period as conventionally used may be typically needed to be kept to ensure that the same maximum cell size may continue to be supported. An advantage with this approach is that the better coverage of the 2 TS EC-RACH, compared to a 1 TS EC-RACH mapping, may be utilized and that an even longer synchronization sequence may be used to further improve the coverage extension.

FIG. 3 schematically illustrates examples of access burst formats for comparison. FIG. 3*a* shows a conventional, i.e. according to the prior art, access burst format for 1 TS on the EC-RACH. FIG. 3*b* shows an example of an access burst format for 1 TS on the EC-RACH according to the first group of embodiments. FIG. 3*c* shows an example of an access burst format for 2 TS on the EC-RACH according to the second group of embodiments.

As may be seen in the figure, owing to the burst format over 1 TS according to the first group of embodiments, the length of the synchronization sequences may be increased from 41 bits to 88 bits, implying roughly an additional processing gain of 3 dB, i.e. 10 log 10(88/41). If instead the burst format according to the second group of embodiments is used, there may be not only a gain from an increased synchronization sequence length resulting from the removal of the encrypted bits carrying the payload, but also from the removal of the guard period between the first and second TS. Still, the same legacy guard period of 68 bits may be kept, and hence the same cell size as today may be supported. For the second group of embodiments, an additional processing gain may be estimated to 7.8 dB, 10 log 10(244/41). This approach may thus both meet and add a margin to a targeted additional coverage improvement of 4-6 dB as discussed above.

Embodiments of a first method, performed by a communication device 120, for supporting a random access procedure in a wireless communication network 100, will now be described with reference to the flowchart depicted in FIG. 4. The communication device 120 may be understood to operate in the wireless communication network 100.

The method may comprise the actions described below. In some embodiments all the actions may be performed. One or more embodiments may be combined, where applicable. All possible combinations are not described to simplify the description. In FIG. 4, an optional action is indicated with dashed lines.

Action 401

In order to further extend the coverage of the EC-RACH in the wireless communications network 100 without unnecessary signalling—e.g., without increasing the number of repetitions—, the communication device 120 in this Action 401 provides an indicator for indicating a presence of an initial access request by the communication device 120. The initial access request is part of the random access procedure. The indicator comprises a pre-defined synchronization sequence, wherein, as described in relation to FIGS. 3*b* and 3*c*, one of: i) the indicator comprises a first access burst extending over one time slot, wherein the first access burst comprises the pre-defined synchronization sequence, and the pre-defined synchronization sequence is longer than 41 bits, and ii) the indicator comprises a second access burst extending over two time slots, wherein the second access burst comprises the pre-defined synchronization sequence, and the pre-defined synchronization sequence is longer than 88 bits.

It may be understood that the communication device 120 in this Action 401 may provide the indicator for indicating the presence of the initial access request for the case of extended coverage on the random access channel. That is, the indicator may be understood to indicate that the communication device 120 is sending the initial access request while in a radio environment that requires an extension of the maximum coupling loss currently supported using legacy methods.

As explained above, the advantage of using a synchronization sequence longer than the 41 bits of the existing methods may be understood to be an improved coverage on the random access channel without having to use excessive repetitions that may drain the capacity of the EC-RACH channel. This is because the receiver of the indicator may be enabled to perform a more accurate detection of the signal.

Each time slot may typically have one and the same predetermined duration and/or a duration according to a RAT of the wireless communication network, e.g. according to GSM and/or EC-GSM. Each time slot may correspond to 156 bits. Time slot may be named TS elsewhere herein.

In some particular embodiments, as the example shown in FIG. 3*b*, the pre-defined synchronization sequence may be 88 bits long.

In some other particular embodiments, as the example shown in FIG. 3*c*, the pre-defined synchronization may be 244 bits long.

Any of the first access burst and the second access burst may additionally comprise a guard period. For example, the first access burst may comprise or consist of a pre-defined synchronization sequence and a guard period. In some embodiments where each time slot may correspond to 156 bits, the pre-defined synchronization sequence may be 88 bits long and the guard period may be 68 bits long.

In another example, the second access burst may comprise a pre-defined synchronization sequence that extends over at least one of the two time slots and typically also comprises a guard interval that extends over at least part of what remains of the two time slots. The guard period may be 68 bits long.

In some examples, the second access burst may consist of the pre-defined synchronization sequence and of the guard interval. The pre-defined synchronization sequence may then be 244 bits long.

In a third group of embodiments, there may be both a longer synchronization sequence and some encrypted bits for transfer of information bits to, for example, communicate (i) a downlink coverage class (DL CC) to be used in EC-GSM, (ii) access cause, and/or (iii) random reference, all of which may be part of a conventional access request message payload, see e.g. FIG. 3*a*. Since, as mentioned above, the processing gain for the second group of embodiments may be made larger than a targeted or needed coverage improvement, it may be possible to shorten the synchronization sequence, but still keep it longer than the conventional length, and utilize the resulting unused bits to thus add a payload, e.g., encrypted information bits, to the initial access request sent by the communication device 120. The DL CC may be understood as the number of radio block repetitions to be used by the network when sending a message to the communication device 120 on the EC-AGCH.

Conventionally on the EC-RACH, an uplink coverage class (UL CC) is indicated by the synchronization sequence chosen and the DL CC is indicated in the actual message content. For any of the new burst formats discussed herein, and for a fourth group of embodiments, a number of pre-defined Extended Coverage Access Bursts (ECAB) may be defined where the DL CC is implicitly communicated by the selection of the synchronization sequence instead of explicitly communicating the DL CC to the network using encrypted information bits included in the initial access request sent by the communication device 120. The DL CC may be signaled by the use of a specific synchronization sequence in the ECAB by the wireless device.

Accordingly in some embodiments, any of the first access burst and the second access burst may comprise information for identifying one or more of the following: a downlink coverage class, an access cause, and a random reference. The access cause may be understood as an indication of why the communication device 120 is sending the initial access request. The random reference may be understood as a random value selected by the communication device 120 and echoed by the network node 110 when sending a corresponding response to the communication device 120 on a downlink control channel, e.g., the EC-AGCH.

In some embodiments, the one or more of: the downlink coverage class, the access cause, and the random reference may be communicated by a selection of the pre-defined synchronization sequence. In some examples, the first and/or second access burst may comprise a pre-defined synchronization sequence associated with, such as mapped to, a particular downlink coverage class. The association, e.g. mapping, may be predetermined and/or predefined. The pre-defined synchronization sequence may be one of, e.g. may have been selected from, a group of different pre-defined synchronization sequences associated with different downlink coverage classes, respectively.

In other embodiments, the one or more of: the downlink coverage class, the access cause, and the random reference may be communicated by encrypted bits included in any of the first access burst and the second access burst, separately from the pre-defined synchronization sequence. The encrypted bits may be understood as information bits. In some examples, the second access burst may additionally comprise one or more further sets of bits, such as a set of information bits, that may be encrypted bits and/or bits for carrying payload. The one or more further sets of bits, for example, encrypted information bits, may e.g., comprise information for identifying one or more of the following: the downlink coverage class, the access cause, the random reference.

Therefore, another advantage of embodiments herein comprises a possibility to convey some information using the EC-RACH channel and still improve the coverage.

Action 402

Once the communication device 120 has provided the indicator, in this Action 402, the communication device 120 transmits the indicator on a random access channel, e.g. on the EC-RACH, in uplink to the network node 110 of the wireless communication network 100. The indicator indicates the presence to said network node 110 of the initial access request by the communication device 120.

As stated earlier, it may be understood that the indicator indicates the presence to the network node 110 of the initial access request by the communication device 120 for the case of extended coverage on a random access channel. That is, that the indicator indicates that the communication device 120 is sending an initial access request while in a radio environment that requires an extension of the maximum coupling loss currently supported using legacy methods.

Action 403

In some embodiments, the communication device 120 may, in this Action 403, monitor an access grant channel e.g. the EC-AGCH, for a response to the transmitted indicator.

The monitoring may be performed only during a time period for which the indicator may be valid, e.g. during a time period for which an access request comprising the indicator may be valid. The monitoring may be performed during the time period since responses received outside the monitored time period may typically correspond to responses intended for other communication devices. This time period may be predefined and/or predetermined, e.g. by information, e.g. System Information (SI), previously received by the communication device 120 from the wireless communication network 100. This may be understood to help ensure the communication device 120 does not act on a response sent on the EC-AGCH for which the communication device 120 is not the intended recipient which, if acted on, would reduce the efficiency of radio resource utilization as it could lead to Temporary Block Flow (TBF) establishment or contention resolution failure.

Considering the first group of embodiments, a risk of having multiple wireless devices accessing at the same time and finding the matching response on the EC-AGCH is increased, since in existing methods, a 3 bit random reference is used in the access channel request, and these three bits are echoed back in the message sent on the EC-AGCH. In some embodiments herein, these random reference bits may not be included in the indicator, to be able to lengthen the synchronization sequence. This inclusion of random reference bits provides that, for example, two Mobile Stations (MSs) accessing at the same time only to have a ⅛th risk of colliding. According to embodiments herein, if e.g., no information is transmitted as in the third group of embodiments to assist in the contention resolution, e.g. by including the 3 bit random reference, it may no longer be possible to distinguish between two users, i.e. here understood as different wireless devices, already on the EC-RACH channel. That is, any two, or more, users accessing using the same physical resources in the UL may monitor the same EC-AGCH in the DL and consider the content to be valid if addressing the same previous access on the EC-RACH channel.

To enable to distinguish between different users, understood as different wireless devices, accessing at the same time and therefore enable contention resolution by the communication device 120, in some embodiments, information within the response that may have been sent on the EC-AGCH may identify a "Last TDMA Frame", e.g. by its value, in which in which the network node 110 received the corresponding initial access request for which it is sending the response. Since the communication device 120 may be able to determine the last TDMA in which the access request was sent, the communication device 120 may be able to check if there is a match between the value reported by the network node 110 in the response, with its own recorded value. This may help ensure a the communication device 120 does not act on a response sent on the EC-AGCH that:
a) for which response the wireless device is the intended recipient but the response has experienced excessive delay, which would reduce the efficiency of radio resource utilization including Temporary Block Flow (TBF) establishment failure; or b) which response is intended to address an access request from a different wireless device, which would increase the risk of contention between multiple wireless devices. If acted on, the response, could lead to Temporary Block Flow (TBF) establishment or contention resolution failure.

According to the foregoing, in some embodiments, users may be distinguished after the initial access request based on one or more of: a) a value of a Last TDMA Frame in which the indicator was sent; and b) a random reference value indicated by the communication device 120, e.g., a 3 bit random reference. The random reference bits may be e.g., included as part of the payload, that is, the encrypted information bits.

However, it may here be considered that the wireless devices operating according to embodiments herein may only be such that make use of a lower output power class, such as discussed above, and may also only be such that are subject to a high level of extended coverage. These devices may in practice, most likely, only be a small fraction of all wireless devices operating according to EC-GSM. The risk of collisions by wireless devices using the same physical resources may thus be a small problem in practice.

In some embodiments, as will be explained later, if the network node 110 may not have had an opportunity to estimate a Time Advance (TA) with sufficient accuracy based on the transmitted indicator, the response to the transmitted indicator may lack a TA value. In such embodiments, the communication device 120 may receive the estimated TA value in a later response from the network node 110, in which case, the received TA value may then have been estimated with greater accuracy. This is because the network node 110 may delay the estimation of the TA until it may be in a position to estimate it more accurately, based on e.g., an increased number of repeated transmissions made by the communication device 120 when transmitting on an assigned packet channel, e.g., an EC-PDTCH, compared to the number of repeated transmissions made by the communication device 120 when sending an initial access request on the random access channel.

Figure 4:
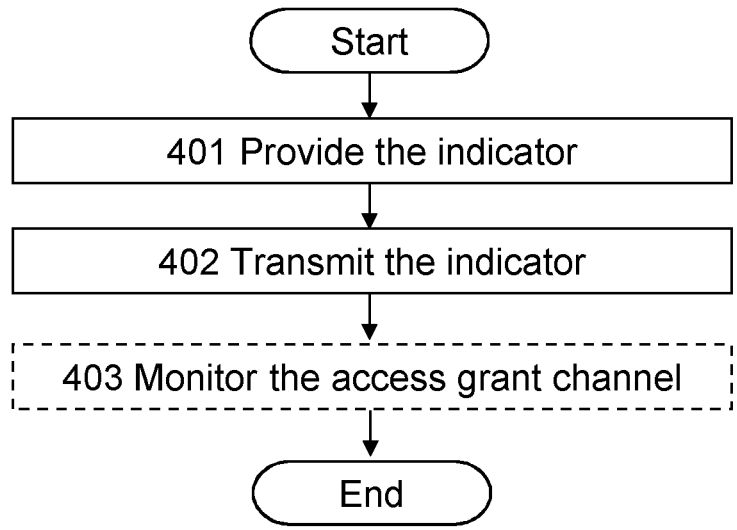
Figure 5:
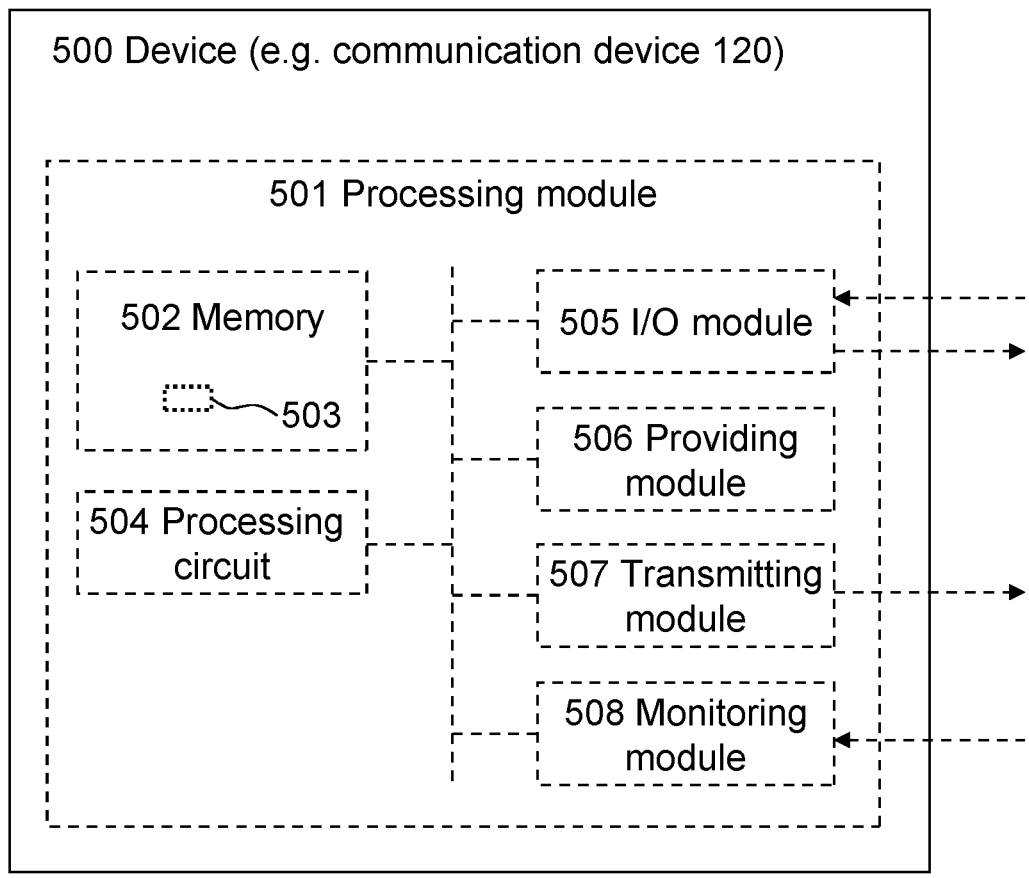

FIG. 5 is a schematic block diagram for illustrating embodiments of a device 500, that may be the communication device 120, and how the communication device 120 may be configured to perform the method and/or one or more actions described herein in connection with FIG. 4.

Accordingly, the device 500, 120, is configured to support a random access procedure in a wireless communication network 100.

Hence, the device 500, 120 may comprise:

A processing module 501, such as a means, one or more hardware modules, including e.g. one or more processors, and/or one or more software modules for performing said methods and/or actions.

A memory 502, which may comprise, such as contain or store, a computer program 503. The computer program comprises 'instructions' or 'code' directly or indirectly executable by the communication device 120 so that it performs the said methods and/or actions. The memory 502 may comprise one or more memory units and may be further be arranged to store data, such as configurations and/or applications involved in or for performing functions and actions of embodiments herein.

A processing circuit 504 as an exemplifying hardware module and may comprise or correspond to one or more processors. In some embodiments, the processing module may comprise, e.g. 'is embodied in the form of' or 'realized by' the processing circuit. In these embodiments, the memory may comprise the computer program executable by the processing circuit, whereby the node comprising it is operative, or configured, to perform said method and/or actions. The computer program 503, comprises instructions which, when executed on at least one processing circuit 504, cause the at least one processing circuit 504 to carry out the method according to FIG. 4.

An Input/Output (I/O) module 505, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The device 500, 120 may also comprise other exemplifying hardware and/or software module(s) as may have been described elsewhere in the present disclosure, which module(s) may be fully or partly implemented by the respective processing circuit. For example, the device 500, 120 may further comprise a providing module 506, a transmitting module 507 and/or a monitoring module 508.

Hence, the device 500, 120 and/or the processing module 501 and/or the processing circuit 504 and/or providing module 506 may be operative, or configured, to provide the indicator for indicating the presence of the initial access request by the device 500, 120. The initial access request is part of the random access procedure. The indicator comprises the pre-defined synchronization sequence, and one of: i) the indicator comprises the first access burst extending over one time slot, wherein the first access burst comprises the pre-defined synchronization sequence, and the pre-defined synchronization sequence is longer than 41 bits, and ii) the indicator comprises the second access burst extending over two time slots, the second access burst comprising the pre-defined synchronization sequence, and the pre-defined synchronization sequence is longer than 88 bits.

As stated earlier, the indicator may be understood to indicate the presence of the initial access request by the device 500, 120 for the case of extended coverage on the random access channel. That is, the indicator may indicate that the communication device 500, 120 is sending an initial access request while in a radio environment that requires an extension of the maximum coupling loss currently supported using legacy methods.

The device 500, 120 and/or the processing module 501 and/or the processing circuit 504 and/or the I/O module 505 and/or the providing module 506 are operative, or configured, to transmit the indicator on the random access channel in uplink to the network node 700, 110 of the wireless communication network 100, wherein the indicator indicates the presence to said network node 700, 110 of the initial access request by the device 500, 120.

In some embodiments, the pre-defined synchronization sequence may be 88 bits long.

In some embodiments, the pre-defined synchronization sequence may be 244 bits long.

Any of the first access burst and the second access burst may additionally comprise the guard period.

In some embodiments, any of the first access burst and the second access burst may comprise information for identifying one or more of the following: the downlink coverage class, the access cause, and the random reference.

The one or more of: the downlink coverage class, the access cause, and the random reference may be configured to be communicated by the selection of the pre-defined synchronization sequence.

In some embodiments, the one or more of: the downlink coverage class, the access cause, and the random reference may be configured to be communicated by encrypted bits included in any of the first access burst and the second access burst, separately from the pre-defined synchronization sequence. The encrypted bits may be e.g., information bits.

In some embodiments, the device 500 and/or the processing module 501 and/or the processing circuit 504 and/or the I/O module 505 and/or the monitoring module 506 may be further operative, or configured, to monitor the access grant channel for the response to the transmitted indicator. Users may be configured to be distinguished after the initial access request based on one or more of: a) the value of a Last TDMA Frame in which the indicator was configured to be sent; and b) the random reference value configured to be indicated by the device 500, 120.

The response may be configured to lack a TA value

Figure 6:
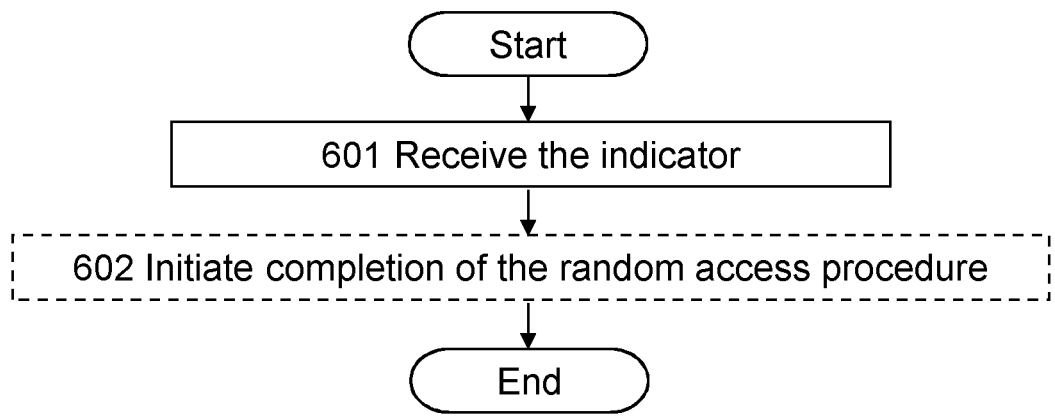

Embodiments of method, performed by the network node 110, for supporting the random access procedure in the wireless communication network 100, will now be described with reference to the flowchart depicted in FIG. 6. As stated earlier, the network node 110 may operate in the wireless communication network 100.

The detailed description of some of the following corresponds to the same references provided above, in relation to the actions described for the communication device 120, and will thus not be repeated here to simplify the description. For example, the random access channel may be the EC-RACH.

The method comprises the actions described below. One or more embodiments may be combined, where applicable. All possible combinations are not described to simplify the description.

Action 601

In this Action 601, the network node 110 receives, from the communication device 120, the indicator on the random access channel on the uplink, the indicator indicating the presence of the initial access request by the communication device 120. The initial access request is part of the random access procedure. The indicator comprises the pre-defined synchronization sequence, wherein, as described earlier, one of: i. the indicator comprises the first access burst extending over one time slot, wherein the first access burst comprises the pre-defined synchronization sequence, the pre-defined synchronization sequence being longer than 41 bits, and ii) the indicator comprises the second access burst extending over two time slots, said second access burst comprising the pre-defined synchronization sequence, the pre-defined synchronization sequence being longer than 88 bits.

As described earlier, in some embodiments, the pre-defined synchronization sequence may be 88 bits long.

In other embodiments, the pre-defined synchronization sequence may be 244 bits long.

Any of the first access burst and the second access burst may additionally comprise a guard period.

Any of the first access burst and the second access burst may comprise information for identifying one or more of the following: the a downlink coverage class, the access cause, and the random reference, as explained earlier.

In some particular embodiments, the one or more of: the downlink coverage class, the access cause, and the random reference may be communicated by the selection of the pre-defined synchronization sequence.

In other particular embodiments, the one or more of: the downlink coverage class, the access cause, and the random reference may be communicated by encrypted bits included in any of the first access burst and the second access burst, separately from the pre-defined synchronization sequence. The encrypted bits may be e.g., information bits.

As explained earlier, in some embodiments, users may be distinguished after the initial access request based on one or more of: a) the value of a Last TDMA Frame in which the indicator was received; and b) a random reference value indicated by the communication device 120.

Action 602

Receipt of the indicator by the network node 110 may indicate presence to the network node 110 of the initial access request by the communication device 120. This may be understood to be for the case of extended coverage on a random access channel, that is, the indicator may indicate that the communication device 120 is sending an initial access request while in a radio environment that requires an extension of the maximum coupling loss currently supported using legacy methods. With the introduction of new burst formats as in the embodiments discussed above, the network, e.g., the network node 110, may detect that an access attempt from a device with a lower output power class, such as discussed above, has been made. The network node 110 may then, in response to the receipt, initiate completion of the random access procedure with the communication device 120, e.g. by sending the response on the access grant channel, e.g. the Extended Coverage Access Grant CHannel (EC-AGCH) of EC-GSM.

In this Action 602, the network node 110 initiates, in response to the received indicator, completion of the random access procedure with the communication device 120.

Initiating providing may be understood as beginning or triggering outputting, or sending, e.g., via a radio link. Initiation completion of the random access procedure typically may comprise to send a response on an access grant channel, e.g. the EC-AGCH. In some embodiments, to help to distinguish among different users, that is different communication devices such as the communication device 120, the response may identify a TDMA frame in which the indicator was received. In case the indicator is received in several TDMA frames before sending the response, only the last TDMA frame in which the indicator was received may be identified. Accordingly, in addition, information within the response that sent on the EC-AGCH may identify a "Last TDMA Frame", e.g. by its value it may identify the last TDMA frame in which the corresponding access request was received on the EC-RACH.

It may be assumed for the third group of embodiments that only limited information may be transmitted that requires modification of an existing random access procedure, including contention resolution. This means that a procedure to assign resources for further system access may need some modifications, e.g. on the EC Access Grant Channel (EC-AGCH). For example:

UL resources may be assigned on the EC Packet Data Traffic Channel (EC-PDTCH) and conventional contention resolution may be used. This assumes that an accurate Timing Advance (TA) value may be estimated on the EC-RACH since the guard period on the EC-PDTCH is limited. Hence, in this case, transmission by the communication device 120 may then need to be done with a correct TA value; or UL resources may be assigned through a single EC Packet Associated Control Channel (EC-PACCH) where the communication device 120 may use the corresponding EC-PACCH resources to transmit a set of regular, such as conventional, access bursts, i.e. without TA and with a payload size of 11 bits, encoded to 36 bits, i.e. as shown in FIG. 3*a*. The content of a message for this may be, for example, a conventional EC PACKET CHANNEL REQUEST, or a modification thereof to better suit the access type, since the possible access types indicated by a wireless device when transmitting a message using the uplink EC-PACCH may be different from the possible access types indicated when transmitting an initial access request on a random access channel. In this case, the communication device 120 may look, i.e. monitor, for a response on the downlink EC-PACCH corresponding to a transmission made on its assigned uplink EC-PACCH and when a matching response is received, the communication device 120 may use the uplink EC-PDTCH resources assigned therein and continue the contention resolution in a conventional manner. Note that in the case where a TA value is not provided by the network node 110 when sending the communication device 120 a response to its initial access request on the EC-AGCH, the contention resolution process may be deferred until the communication device 120 receives TA information, thereby enabling the communication device 120 to send a larger amount of information on its assigned EC-PDTCH resources, such as a 32 bit device identity field.

In both cases a maximum time for which the access request is 'valid' may be determined e.g. using system information that indicates how long a wireless device should look, i.e. monitor, for a response on the EC-AGCH after sending a long sync based access request on the EC-RACH as in embodiments herein.

In some embodiments, as previously discussed, the network node 110 may not have had an opportunity to estimate a Time Advance (TA) with sufficient accuracy. This is because the network node 110 may delay the estimation of the TA until it may be in a position to estimate it more accurately based on e.g., an increased number of repeated transmissions made by the communication device 120 when transmitting on an assigned packet channel, e.g., an EC-PDTCH, compared to the number of repeated transmissions made by the communication device 120 when sending an initial access request on the random access channel. In such embodiments, the response from the network node 110 to the received indicator may lack a TA value.

A summary of the description just provided may be provided considering that a GSM TS may be 156.25 bits long, leaving 68.25 bits of guard. A conventional access burst may consist of 8 bits left tail, 41 bits synchronization sequence, 36 bits encrypted bits and 3 bits right tail. A current access burst may be denoted (n), with n=0, . . . , 87. Then, embodiments as described above may be summarized as follows. In the first group of embodiments, the entire access burst may be replaced by an 88 bits long synchronization sequence. Still leaving 68.25 bits of guard to be able to receive the delayed signal from a mobile station at a distance of 35 km. In the second group of embodiments, two timeslots may be used to access the network instead of one, giving a total of 156.25*2=312.5 bits to use for access to the network. Still leaving 68.25 bits for delayed signals gives 244.5≈244 bits for use as a synchronization sequence. In the third group of embodiments, some bits of the synchronization sequence in the first and/or second embodiments may be replaced by a payload resulting in a possibility to both increase the processing gain and convey information. In the fourth group of embodiments, a set of pre-defined extended coverage access bursts may be defined and may differ only in their synchronization sequence. A DL CC may be communicated by the selection of the synchronization sequence.

Apart from the modified access burst of the initial access, also the contention resolution phase following the initial access may need modification taking into account that potentially no information, due to the modified access burst, may be provided in an access channel request message to distinguish users using the same resources for their initial access. Two possibilities are outlined in this case, either with a TA value estimated at a network node, e.g. BTS, already at the initial access leading to the possibility to continue the contention resolution phase as done today on dedicated resources, or that the access procedure is initiated in dedicated resources, assuming no TA is assigned by the network node, e.g. BTS.

Figure 7:
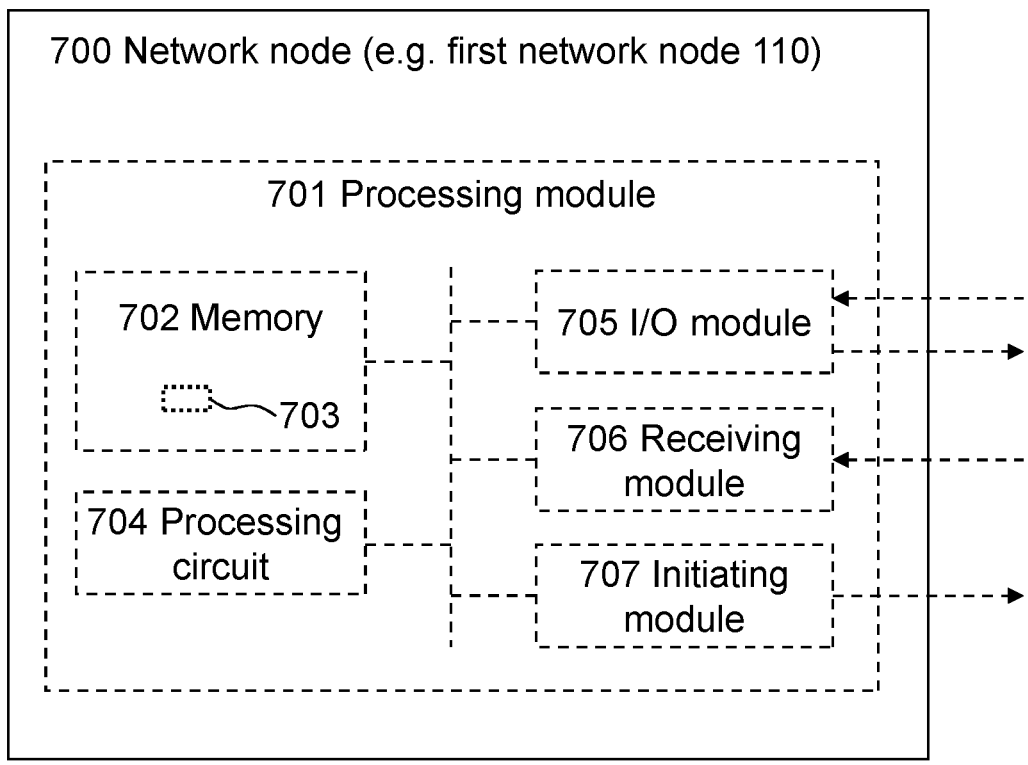

FIG. 7 is a schematic block diagram for illustrating embodiments of a network node 700 that may be the first network node 110, and how the network node 700 may be configured to perform the method and/or one or more actions described herein e.g. relating to, e.g. for being performed by, the network node 110. Accordingly, the network node 700, 110, is configured to support the random access procedure in the wireless communication network 100.

Hence, the network node 700 may comprise:

A processing module 701, such as a means, one or more hardware modules, including e.g. one or more processors, and/or one or more software modules for performing said methods and/or actions.

A memory 702, which may comprise, such as contain or store, a computer program 703. The computer program comprises 'instructions' or 'code' directly or indirectly executable by the respective network node so that it performs the said methods and/or actions. The memory 702 may comprise one or more memory units and may be further be arranged to store data, such as configurations and/or applications involved in or for performing functions and actions of embodiments herein.

A processing circuit 704 as an exemplifying hardware module and may comprise or correspond to one or more processors. In some embodiments, the processing module may comprise, e.g. 'is embodied in the form of' or 'realized by' the processing circuit. In these embodiments, the memory may comprise the computer program executable by the processing circuit, whereby the node comprising it is operative, or configured, to perform said method and/or actions. The computer program 703, comprises instructions which, when executed on at least one processing circuit 704, cause the at least one processing circuit 704 to carry out the method according to FIG. 6.

An Input/Output (I/O) module 705, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The network node 700 may also comprise other exemplifying hardware and/or software module(s) as may have been described elsewhere in the present disclosure, which module(s) may be fully or partly implemented by the processing circuit 704. For example, the network node 700 may further comprise receiving module 706 and/or an initiating module 707.

The network node 700 and/or the processing module 701 and/or the processing circuit 704 and/or the I/O module 705 and/or the receiving module 706 are operative, or configured, to receive from the device 500, 120, the indicator on the random access channel on the uplink. The indicator is further configured to indicate the presence of the initial access request by the device 500, 120. The initial access request is part of the random access procedure. The indicator comprises the pre-defined synchronization sequence, and one of: i) the indicator comprises the first access burst extending over one time slot, wherein the first access burst comprises the pre-defined synchronization sequence, and the pre-defined synchronization sequence being longer than 41 bits; and ii) the indicator comprises the second access burst extending over two time slots, the second access burst comprising the pre-defined synchronization sequence, and the pre-defined synchronization sequence is longer than 88 bits.

As mentioned earlier, the indicator may be understood to indicate the presence of the initial access request by the device 500, 120 for the case of extended coverage on the random access channel. That is, the indicator may indicate that the communication device 500, 120 is sending an initial access request while in a radio environment that requires an extension of the maximum coupling loss currently supported using legacy methods.

In some embodiments, the pre-defined synchronization sequence may be 88 bits long.

In some embodiments, the pre-defined synchronization sequence may be 244 bits long.

Any of the first access burst and the second access burst may additionally comprise the guard period.

Any of the first access burst and the second access burst may comprise information for identifying one or more of the following: the downlink coverage class, the access cause, and the random reference The one or more of: the downlink coverage class, the access cause, and the random reference may be communicated by the selection of the pre-defined synchronization sequence.

In some embodiments, the one or more of: the downlink coverage class, the access cause, and the random reference may be configured to be communicated by encrypted bits included in any of the first access burst and the second access burst, separately from the pre-defined synchronization sequence. The encrypted bits may be e.g., information bits.

The network node 700 and/or the processing module 701 and/or the processing circuit 704 and/or the I/O module 705 and/or the completing module 707 are operative, or configured, to initiate, in response to the received indicator, completion of the random access procedure with the device 500, 120.

In some embodiments, users may be configured to be distinguished after the initial access request based on one or more of: a) the value of a Last TDMA Frame in which the indicator was configured to be received; and b) the random reference value configured to be indicated by the device 500, 120.

The response from the network node 700, 110 to the received indicator, may be configured to lack a TA value.

Figure 8A:
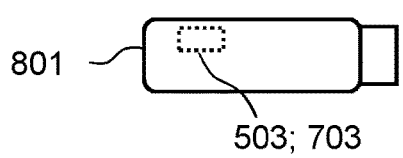
FIGS. 8a-c are schematic drawings illustrating embodiments relating to computer programs and computer readable media to cause the device and/or network node to perform, respectively, methods according to embodiments herein.
Figure 8B:
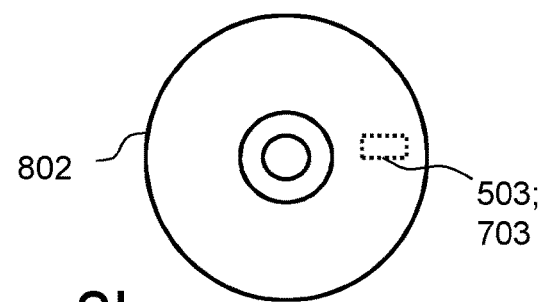
Figure 8C:
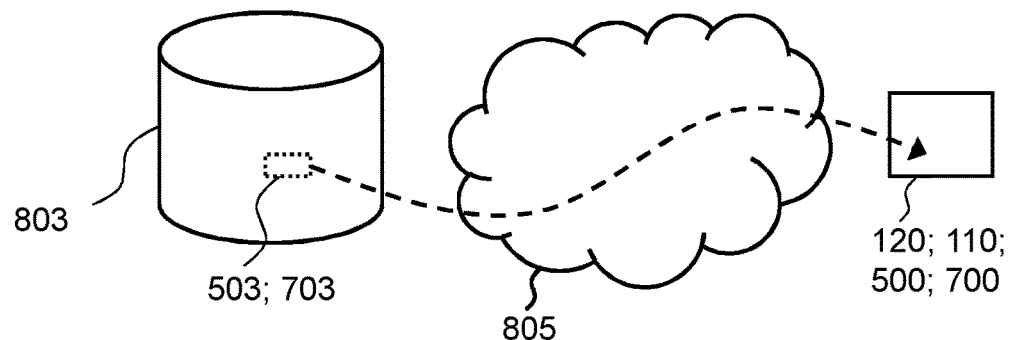

FIGS. 8a-c are schematic drawings illustrating embodiments relating to a computer program that may be any one of the computer programs 503 and 703, and that comprises instructions that when executed by the respective processing circuit causes the node comprising it to perform the respective method as described above.

In some embodiments there is provided a computer program product, i.e. a data carrier, comprising a computer-readable medium and the computer program stored on the computer-readable medium. Hence, a computer-readable medium, having stored thereon a computer program 503, comprising instructions which, when executed on at least one processing circuit 504, cause the at least one processing circuit 504 to carry out the method according to FIG. 4. Similarly, a computer-readable medium, having stored thereon the computer program 703, comprises instructions which, when executed on the at least one processing circuit 704, causes the at least one processing circuit 704 to carry out the method according to FIG. 6. By computer readable medium may be excluded a transitory, propagating signal and the computer readable medium may correspondingly be named non-transitory computer readable medium. Non-limiting examples of the computer-readable medium is a memory card or a memory stick 801 as in FIG. 8a, a disc storage medium 802 such as a CD or DVD as in FIG. 8*b*, a mass storage device 803 as in FIG. 8*c*. The mass storage device 803 is typically based on hard drive(s) or Solid State Drive(s) (SSD). The mass storage device 803 may be such that is used for storing data accessible over a computer network 805, e.g. the Internet or a Local Area Network (LAN).

The computer programs, respectively, may furthermore be provided as a pure computer program or comprised in a file or files. The file or files may be stored on the computer-readable medium and e.g. available through download e.g. over the computer network 805, such as from the mass storage device 803 via a server. The server may e.g. be a web or File Transfer Protocol (FTP) server. The file or files may e.g. be executable files for direct or indirect download to and execution on the a node for carrying out a method, e.g. by the processing circuit, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network", or simply "NW", as used herein typically, as should be realized without any information on the contrary, refer to the wireless communication network 100.

The term "MS", as used herein typically, as should be realized without any information on the contrary, refer to the communication device 120.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" or "wireless device" as used herein, may as such refer to any type of device arranged to communicate, e.g. with a radio network node, in a wireless, cellular and/or mobile communication system, such as the wireless communication network 100, and may thus be a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, or similar, that may have been used herein, as such should be considering non-limiting and the terminology as such does not imply a certain hierarchical relation. Without any explicit information in the contrary, naming by enumeration should be considered merely a way of accomplishing different names.

Examples Related to Embodiments Herein:

Examples related to embodiments herein may comprise:

A first method, performed by the device 500, e.g. the communication device 120, for supporting a random access procedure in a wireless communication network, such as the wireless communication network 100. Alternatively the method may be described as a method, performed by said device, for making an initial access request of, i.e. that is part of, a random access procedure in the wireless communication network.

The first method may comprise the actions of:

Providing 401 an indicator for indicating presence of an initial access request by the device, which initial access request is part of said random access procedure. The indicator may thus be considered part of or comprised in an access request. Said indicator comprising a first access burst extending over 1 time slot or a second access burst extending over two time slots. The indicator may be understood to implicitly indicate that the communication device 500, 120 is sending an initial access request while in a radio environment that requires an extension of the maximum coupling loss currently supported using legacy methods.

Transmitting 402 the indicator on a random access channel, e.g. on the EC-RACH, i.e. in an uplink, whereby the indicator is receivable by one or more network nodes of the wireless communication network, e.g. the network node 700, such as the network node 110.

The first method may additionally comprise the following action:

Monitoring 403, such as listening on, an access grant channel, for a response to the transmitted indicator.

Examples related to embodiments herein may further comprise:

A second method, performed by the network node 700, e.g. the network node 110, for supporting a random access procedure in a wireless communication network, such as the wireless communication network 100. Alternatively the method may be described as a method, performed by said network node, for handing an initial access request from a device, e.g. the communication device 120, which initial request is part of a random access procedure in the wireless communication network. The indicator may thus be considered part of or comprised in an access request. The indicator may be understood to implicitly indicate that the communication device 500, 120 is sending an initial access request while in a radio environment that requires an extension of the maximum coupling loss currently supported using legacy methods.

The second method comprises the action of:

Receiving 601, from a device 500, e.g. the communication device 120, an indicator on a random access channel, e.g. on the EC-RACH. The indicator is thus received in the uplink. The indicator indicates presence of an initial access request by the device, which initial access request is part of said random access procedure. The indicator may be understood to implicitly indicate that the communication device 500, 120 is sending an initial access request while in a radio environment that requires an extension of the maximum coupling loss currently supported using legacy methods.

The indicator may be as described above for the first method, or in relation to FIG. 4. The first method may additionally comprise the following action:

Initiating 602, in response to the received indicator, completion of the random access procedure with the device.

The invention claimed is:

1. A method, performed by a communication device, for supporting a random access procedure in a wireless communication network, the method comprising:
    providing an indicator for indicating a presence of an initial access request by the communication device, the initial access request is part of said random access procedure, wherein the indicator comprises a pre-defined synchronization sequence, and wherein one of:
        said indicator comprises a first access burst extending over one time slot, wherein said first access burst comprises the pre-defined synchronization sequence, the pre-defined synchronization sequence being longer than 41 bits, and
        said indicator comprises a second access burst extending over two time slots, said second access burst comprising the pre-defined synchronization sequence, the pre-defined synchronization sequence being longer than 88 bits; and
    transmitting the indicator on a random access channel in uplink to a network node of the wireless communication network, wherein the indicator indicates the presence to said network node of the initial access request by the communication device.

2. The method according to claim 1, wherein any of the first access burst and the second access burst additionally comprise a guard period.

3. The method according to claim 1, wherein any of the first access burst and the second access burst comprise information for identifying one or more of the following: a downlink coverage class, an access cause, and a random reference.

4. The method according to claim 1, further comprising:
    monitoring an access grant channel for a response to the transmitted indicator, wherein users are distinguished after the initial access request based on one or more of:
        a value of a Last Time Division Multiple Access (TDMA) Frame in which the indicator was sent; and
        a random reference value indicated by the communication device.

5. The method according to claim 4, wherein the response lacks a Time Advance (TA) value.

6. A method, performed by a network node, for supporting a random access procedure in a wireless communication network, the method comprising:
    receiving from a communication device, an indicator on a random access channel on the uplink, the indicator for indicating a presence of an initial access request by the communication device, wherein the initial access request is part of said random access procedure, wherein the indicator comprises a pre-defined synchronization sequence, and wherein one of:
        said indicator comprises a first access burst extending over one time slot, wherein said first access burst comprises the pre-defined synchronization sequence, the pre-defined synchronization sequence being longer than 41 bits, and
        said indicator comprises a second access burst extending over two time slots, said second access burst comprising the pre-defined synchronization sequence, the pre-defined synchronization sequence being longer than 88 bits; and
    initiating, in response to the received indicator, completion of the random access procedure with the communication device.

7. The method according to claim 6, wherein any of the first access burst and the second access burst additionally comprise a guard period.

8. The method according to claim 6, wherein any of the first access burst and the second access burst comprise information for identifying one or more of the following: a downlink coverage class, an access cause, and a random reference.

9. The method according to claim 6, wherein users are distinguished after the initial access request based on one or more of:
    a value of a Last Time Division Multiple Access (TDMA) Frame in which the indicator was received; and
    a random reference value indicated by the communication device.

10. The method according to claim 9, wherein a response from the network node to the received indicator, lacks a Time Advance (TA) value.

11. A device, configured to support a random access procedure in a wireless communication network, the device comprising a processing circuit configured to:
    provide an indicator for indicating a presence of an initial access request by the device, the initial access request is part of said random access procedure, wherein the indicator comprises a pre-defined synchronization sequence, and wherein one of:

said indicator comprises a first access burst extending over one time slot, wherein said first access burst comprises the pre-defined synchronization sequence, the pre-defined synchronization sequence being longer than 41 bits, and said indicator comprises a second access burst extending over two time slots, said second access burst comprising the pre-defined synchronization sequence, the pre-defined synchronization sequence being longer than 88 bits; and cause transmission of the indicator on a random access channel in uplink to a network node of the wireless communication network, wherein the indicator indicates the presence to said network node of the initial access request by the device.

12. The device according to claim 11, wherein any of the first access burst and the second access burst additionally comprise a guard period.

13. The device according to claim 11, wherein any of the first access burst and the second access burst comprise information for identifying one or more of the following: a downlink coverage class, an access cause, and a random reference.

14. A network node, configured to support a random access procedure in a wireless communication network, the network node comprising a processing circuit configured to:

receive from a device, an indicator on a random access channel on the uplink, the indicator for indicating a presence of an initial access request by the device, wherein the initial access request is part of said random access procedure, wherein the indicator comprises a pre-defined synchronization sequence, and wherein one of:

said indicator comprises a first access burst extending over one time slot, wherein said first access burst comprises the pre-defined synchronization sequence, the pre-defined synchronization sequence being longer than 41 bits, and said indicator comprises a second access burst extending over two time slots, said second access burst comprising the pre-defined synchronization sequence, the pre-defined synchronization sequence being longer than 88 bits; and initiate, in response to the received indicator, completion of the random access procedure with the device.

15. The network node according to claim 14, wherein any of the first access burst and the second access burst additionally comprise a guard period.

16. The network node according to claim 14, wherein any of the first access burst and the second access burst comprise information for identifying one or more of the following: a downlink coverage class, an access cause, and a random reference.

* * * * *